(12) United States Patent
Liu

(10) Patent No.: US 9,924,423 B2
(45) Date of Patent: Mar. 20, 2018

(54) DIFFERENT FREQUENCY MEASUREMENT AND EVALUATION METHOD AND APPARATUS OF CLUSTER ANSWERING USER

(71) Applicant: ZTE Corporation, Shenzhen (CN)

(72) Inventor: Zhijun Liu, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 65 days.

(21) Appl. No.: 15/021,257

(22) PCT Filed: Jun. 10, 2014

(86) PCT No.: PCT/CN2014/079600
§ 371 (c)(1),
(2) Date: Apr. 8, 2016

(87) PCT Pub. No.: WO2015/035807
PCT Pub. Date: Mar. 19, 2015

(65) Prior Publication Data
US 2016/0227452 A1   Aug. 4, 2016

(30) Foreign Application Priority Data
Sep. 10, 2013 (CN) .......................... 2013 1 0410044

(51) Int. Cl.
*H04L 12/28* (2006.01)
*H04W 36/00* (2009.01)
(Continued)

(52) U.S. Cl.
CPC ..... *H04W 36/0088* (2013.01); *H04W 36/165* (2013.01); *H04W 36/30* (2013.01);
(Continued)

(58) Field of Classification Search
CPC .................................. H04B 7/00; H04B 7/005
(Continued)

(56) References Cited

U.S. PATENT DOCUMENTS

2008/0227453 A1   9/2008   Somasundaram
2011/0039499 A1   2/2011   Zhang
(Continued)

FOREIGN PATENT DOCUMENTS

CN   1671243 A    9/2005
CN   102474884 A  5/2012
(Continued)

OTHER PUBLICATIONS

International Search Report in international application No. PCT/CN2014/079600, dated Sep. 2, 2014.
(Continued)

*Primary Examiner* — Iqbal Zaidi
(74) *Attorney, Agent, or Firm* — Oppedahl Patent Law Firm LLC

(57) ABSTRACT

A method and apparatus for different-frequency measurement and evaluation by a cluster answering user are provided, which relate to the technical field of communications. The method includes acquiring a public network signal evaluation threshold value and a signal threshold adjustment value, the signal threshold adjustment value being for adjusting an evaluation threshold; saving a result of different-frequency measurement by performing the different-frequency measurement on cells; and evaluating the saved result of different-frequency measurement using the acquired public network signal evaluation threshold value and the acquired signal threshold adjustment value. The method and apparatus enable a cluster terminal to timely measure a better adjacent cell and to switch to the cell, thereby making the cluster terminal always reside in a better (Continued)

cell to use voice and data services, ensuring the quality of the services and bringing user experience.

15 Claims, 2 Drawing Sheets

(51) Int. Cl.
   *H04W 36/16* (2009.01)
   *H04W 36/30* (2009.01)
   *H04W 36/36* (2009.01)
   *H04W 36/20* (2009.01)
   *H04W 84/08* (2009.01)

(52) U.S. Cl.
   CPC ............ *H04W 36/36* (2013.01); *H04W 36/20* (2013.01); *H04W 84/08* (2013.01)

(58) Field of Classification Search
   USPC .................................. 370/328–339; 455/522
   See application file for complete search history.

(56) References Cited

U.S. PATENT DOCUMENTS

| | | |
|---|---|---|
| 2011/0053597 A1 | 3/2011 | Lee |
| 2012/0275371 A1 | 11/2012 | Somasundaram |
| 2013/0077507 A1 | 3/2013 | Yu |
| 2013/0079019 A1 | 3/2013 | Yu |
| 2013/0079048 A1 | 3/2013 | Cai |
| 2013/0079049 A1 | 3/2013 | Yu |
| 2013/0223235 A1 | 8/2013 | Hu |
| 2014/0051449 A1* | 2/2014 | Yerrabommanahalli ............................ H04W 36/30 455/437 |
| 2014/0098761 A1* | 4/2014 | Lee ..................... H04W 74/006 370/329 |
| 2014/0128058 A1 | 5/2014 | Ji et al. |
| 2014/0213259 A1 | 7/2014 | Teyeb |

FOREIGN PATENT DOCUMENTS

| | | |
|---|---|---|
| CN | 102802193 A | 11/2012 |
| CN | 102883361 A | 1/2013 |
| NO | 2014057441 A2 | 4/2014 |
| WO | 2013028128 A1 | 2/2013 |

OTHER PUBLICATIONS

English Translation of the Written Opinion of the International Search Authority in international application No. PCT/CN2014/079600, dated Sep. 2, 2014.

Supplementary European Search Report in European application No. 14844442.5, dated Jun. 27, 2016.

"3rd Generation Partnership Project; Technical Specification Group Radio Access Network; User Equipment (UE) procedures in idle mode and procedures for cell reselection in connected mode (Release 11)", 3GPP Standard; 3GPP TS 25.304, 3RD Generation Partnership Project (3GPP), Mobile Competence Centre ; 650, Route Des Lucioles ; F-06921 Sophia-Antipolis Cedex ; France, vol. RAN WG2, No. VII.3.0, Jun. 29, 2013 (Jun. 29, 2013), pp. 1-53, XP050711999,[retrieved on Jun. 29, 2013].

* cited by examiner

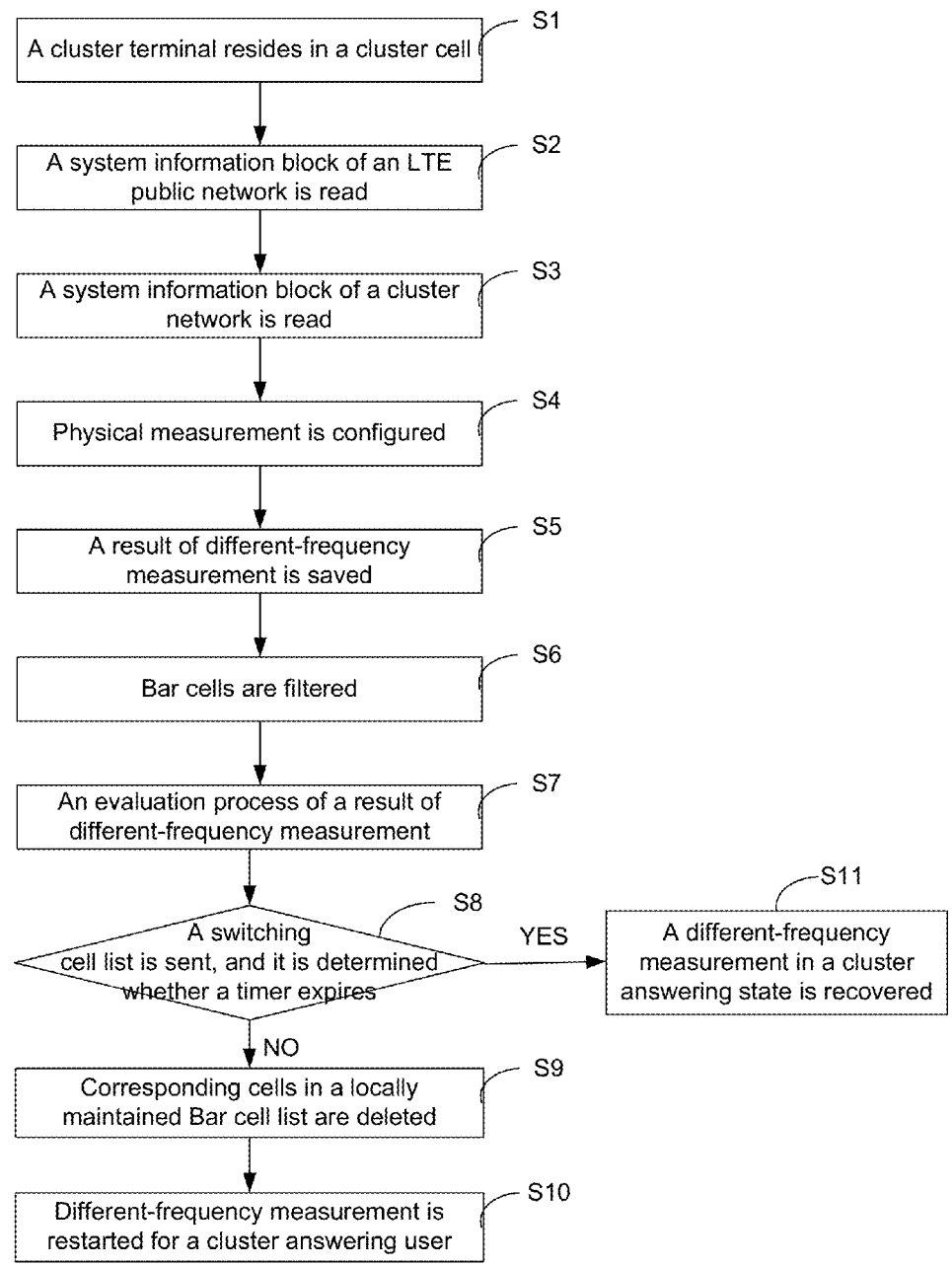

DIFFERENT FREQUENCY MEASUREMENT AND EVALUATION METHOD AND APPARATUS OF CLUSTER ANSWERING USER

TECHNICAL FIELD

The present disclosure relates to the technical field of communications, and in particular to a method and apparatus for different-frequency measurement and evaluation by a cluster answering user.

BACKGROUND

A cluster communication system is a dedicated wireless communication system which is developed to meet command and dispatch requirements of industry users and is applied to a specific industry. A great number of wireless users in the system share a small number of wireless channels. The cluster communication system is a multipurpose and highly-efficient wireless communication system which is mainly applied to command and dispatch. The cluster communication system has the special characteristics of dispatch, group calling, quick calling and the like, and has become a development direction of a next generation cluster system.

A Long Term Evolution (LTE) cluster communication system realizes various requirements and functions of a cluster by extension on the basis of an LTE system. In terms of a networking architecture, an Electronic Product Code (EPC) of an LTE core network and a Decision Support System (DSS) of a cluster core network achieve complete isolation of services and networking of cluster applications, do not depend on a conventional LTE EPC device, do not affect normal running of a conventional LTE EPC core network device, and can isolate a private network and share a public network.

A user is attracted by a cluster service due to a rapid contact way, and therefore the performance of the cluster service is a key factor which decides whether the cluster service can operate successfully. A first index in the performance of the cluster service is voice intelligibility and a data receiving rate. In order to ensure the voice intelligibility and the data receiving rate, a cluster terminal is needed to reside in a better cell. In order to achieve this, the cluster terminal is enabled to timely measure a better adjacent cell and to switch to the cell, thereby making the cluster terminal always reside in a better cell to use voice and data services, and ensuring the quality of the services. However, a problem urgently needed to be solved is how to enable the cluster terminal to timely measure the better adjacent cell and to switch to the cell so as to make the cluster terminal always reside in the better cell to use the voice and data services.

SUMMARY

The embodiments of the present disclosure provide a method and apparatus for different-frequency measurement and evaluation by a cluster answering user, which are intended to solve the technical problem in the traditional art.

According to one aspect of an embodiment of the present disclosure, a method for different-frequency measurement and evaluation by a cluster answering user is provided, which may include the steps that:

a public network signal evaluation threshold value and a signal threshold adjustment value are acquired, wherein the signal threshold adjustment value is for adjusting an evaluation threshold;

a result of different-frequency measurement is saved by performing the different-frequency measurement on cells; and the saved result of the different-frequency measurement is evaluated by using the acquired public network signal evaluation threshold value and the acquired signal threshold adjustment value.

Preferably, the public network signal evaluation threshold value and the signal threshold adjustment value may be acquired from a cluster network system respectively.

Preferably, the step that the result of different-frequency measurement is saved by performing the different-frequency measurement on the cells may include that:

it is determined whether information of a blacklist cell which is not supported by a cluster network is detected by checking the cells;

when the information of the blacklist cell which is not supported by the cluster network is detected, different-frequency measurement is performed on cells except a blacklist cell by using the acquired information of the blacklist cell, and the result of the different-frequency measurement is saved; and when the information of the blacklist cell which is not supported by the cluster network is not detected, different-frequency measurement is performed on all cells, and the result of the different-frequency measurement is saved.

Preferably, the information of the blacklist cell may be acquired from the cluster network system.

Preferably, the public network signal evaluation threshold value may include a public network signal quality evaluation threshold value and a public network signal strength evaluation threshold value, and the signal threshold adjustment value may include a signal quality threshold adjustment value and a signal strength threshold adjustment value.

Preferably, the saved result of the different-frequency measurement may be evaluated in at least one of the following manners:

signal quality value-based evaluation; and signal strength value-based evaluation.

Preferably, the signal quality value-based evaluation may include: accumulating the public network signal quality evaluation threshold value and the signal quality threshold adjustment value to obtain a threshold value meeting cell switching; and the signal strength value-based evaluation may include: accumulating the public network signal strength evaluation threshold value and the signal strength threshold adjustment value to obtain a threshold value meeting cell switching.

According to another aspect of an embodiment of the present disclosure, an apparatus for different-frequency measurement and evaluation by a cluster answering user is provided, which may include:

an acquisition module, configured to acquire a public network signal evaluation threshold value and a signal threshold adjustment value, wherein the signal threshold adjustment value is for adjusting an evaluation threshold;

a different-frequency measurement module, configured to save a result of different-frequency measurement by performing the different-frequency measurement on cells; and an evaluation module, configured to evaluate the saved result of the different-frequency measurement by using the acquired public network signal evaluation threshold value and the acquired signal threshold adjustment value.

Preferably, the different-frequency measurement module may include:

a determination unit, configured to determine whether information of a blacklist cell which is not supported by a cluster network is detected by checking the cells; and a different-frequency measurement unit, configured to perform different-frequency measurement on cells except a blacklist cell by using the acquired information of the blacklist cell and save a result of the different-frequency measurement when the information of the blacklist cell which is not supported by the cluster network is detected, and further configured to perform different-frequency measurement on all cells and save a result of different-frequency measurement when no information of a blacklist cell which is not supported by the cluster network is detected.

Preferably, the evaluation module may include:

a signal quality evaluation unit, configured to accumulate a public network signal quality evaluation threshold value and a signal quality threshold adjustment value to obtain a threshold value meeting cell switching; and a signal strength value evaluation unit, configured to accumulate a public network signal strength evaluation threshold value and a signal strength threshold adjustment value to obtain a threshold value meeting cell switching.

According to another aspect of an embodiment of the present disclosure, a computer readable storage medium is provided, which may include a set of computer executable instructions, wherein the instructions are configured to execute the method for different-frequency measurement and evaluation by a cluster answering user according to the embodiment of the present disclosure.

Compared with the traditional art, the embodiments of the present disclosure have the beneficial effects that:

the embodiments of the present disclosure enable a cluster terminal to timely measure a better adjacent cell and to switch to the cell, thereby making the cluster terminal always reside in a better cell to use voice and data services, ensuring the quality of the services and bringing user experience.

BRIEF DESCRIPTION OF THE DRAWINGS

FIG. 3 is a flowchart of different-frequency measurement and evaluation by a cluster answering user according to an embodiment of the present disclosure.

DETAILED DESCRIPTION

A preferred embodiment of the present disclosure is described below with reference to the drawings in detail. It should be understood that the preferred embodiment described below is only intended to describe and explain the present disclosure, and does not limit the present disclosure.

According to the embodiment of the present disclosure, the different-frequency measurement and evaluation of a cluster answering user are realized by using information about a blacklist cell of a cluster network, an evaluation threshold adjustment value and information about a self-optimized filter bar cell, which are stored in a newly added network information block SIB19 and a newly added network information block SIB20. A switching threshold is adjusted via the newly added network system information block SIB19, and the blacklist cell which is not supported by the cluster network is filtered via the newly added network system information block SIB20.

Figure 1:
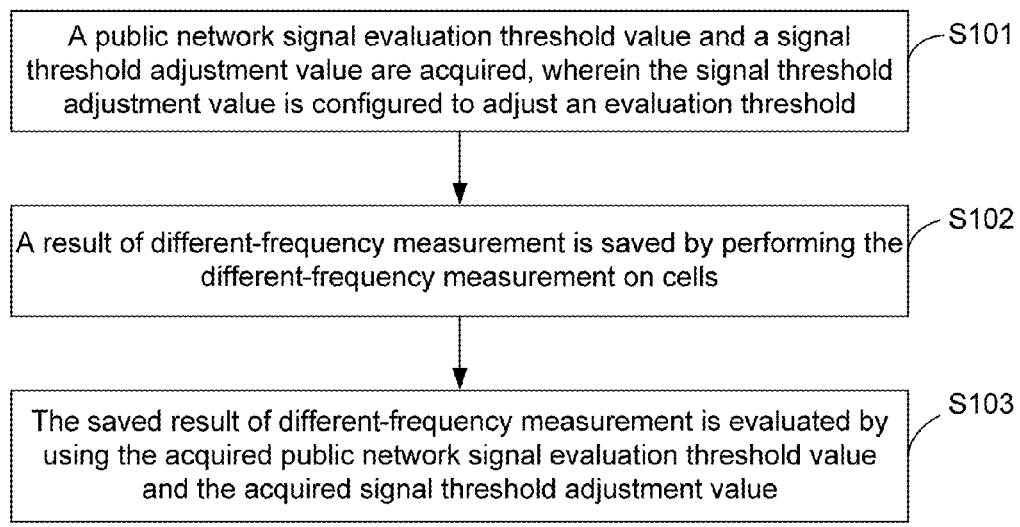
FIG. 1 is a flowchart of a method for different-frequency measurement and evaluation by a cluster answering user according to an embodiment of the present disclosure.

FIG. 1 shows a flowchart of a method for different-frequency measurement and evaluation by a cluster answering user according to an embodiment of the present disclosure. As shown in FIG. 1, the method includes the steps as follows.

Step S101: A public network signal evaluation threshold value and a signal threshold adjustment value are acquired, wherein the signal threshold adjustment value is configured to adjust an evaluated threshold.

Step S102: A result of different-frequency measurement is saved by performing different-frequency measurement on cells.

Step S103: The saved result of different-frequency measurement is evaluated by using the acquired public network signal evaluation threshold value and the acquired signal threshold adjustment value.

In the embodiment of the present disclosure, the public network signal evaluation threshold value and the signal threshold adjustment value are acquired from a cluster network system respectively.

Specifically, the step that the result of different-frequency measurement is saved by performing different-frequency measurement on the cells includes that: it is determined whether information of a blacklist cell which is not supported by a cluster network is detected by checking the cells; when the information of the blacklist cell which is not supported by the cluster network is detected, different-frequency measurement is performed on cells except a blacklist cell by using the acquired information of a blacklist cell, and the result of different-frequency measurement is saved; and when the information of the blacklist cell which is not supported by the cluster network is not detected, different-frequency measurement is performed on all cells, and the result of different-frequency measurement is saved.

In the embodiment of the present disclosure, the information of the blacklist cell is acquired from the cluster network system.

Specifically, the public network signal evaluation threshold value includes a signal quality evaluation threshold value of a public network and a signal strength evaluation threshold value of the public network, and the signal threshold adjustment value includes a threshold adjustment value of signal quality and a threshold adjustment value of signal strength.

In the embodiment of the present disclosure, the saved result of different-frequency measurement is evaluated in at least one of the following modes: a signal quality value-based evaluation mode; and a signal strength value-based evaluation mode.

Specifically, the signal quality value-based evaluation mode includes: accumulating the signal quality evaluation threshold value of the public network and the signal quality threshold adjustment value to obtain a threshold value meeting cell switching; and the signal strength value-based evaluation mode includes: accumulating the signal strength evaluation threshold value of the public network and the signal strength threshold adjustment value to obtain a threshold value meeting cell switching.

Figure 2:
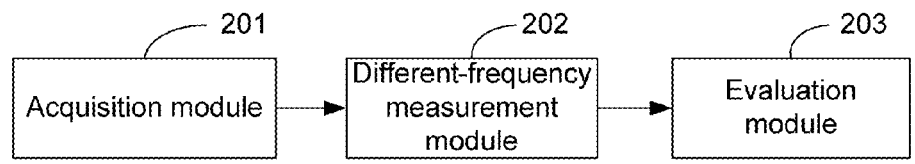
FIG. 2 is a diagram of a apparatus for different-frequency measurement and evaluation by a cluster answering user according to an embodiment of the present disclosure.

FIG. 2 is a diagram of a apparatus for different-frequency measurement and evaluation by a cluster answering user according to an embodiment of the present disclosure. As shown in FIG. 2, the apparatus includes: an acquisition module 201, configured to acquire a public network signal evaluation threshold value and a signal threshold adjustment value, wherein the signal threshold adjustment value is configured to adjust an evaluation threshold; a different-frequency measurement module 202, configured to perform different-frequency measurement on cells and then save a result of the different-frequency measurement; and an evaluation module 203, configured to evaluate the saved result of the different-frequency measurement by using the acquired public network signal evaluation threshold value and the acquired signal threshold adjustment value.

Here, the different-frequency measurement module 202 includes:

a determination unit, configured to determine whether information of a blacklist cell which is not supported by a cluster network is detected by checking the cells; and a different-frequency measurement unit, configured to perform different-frequency measurement on cells except a blacklist cell by using the acquired information of a blacklist cell and save a result of the different-frequency measurement when the information of the blacklist cell which is not supported by the cluster network is detected, and further configured to perform different-frequency measurement on all cells and save a result of different-frequency measurement when the information of the blacklist cell which is not supported by the cluster network is not detected.

Here, the evaluation module 203 includes:

a signal quality evaluation unit, configured to accumulate a public network signal quality evaluation threshold value and a signal quality threshold adjustment value to obtain a threshold value meeting cell switching; and a signal strength value evaluation unit, configured to accumulate a public network signal strength evaluation threshold value and a signal strength threshold adjustment value to obtain a threshold value meeting cell switching.

It is to be noted that the acquisition module 201, the different-frequency measurement module 202 and the evaluation module 203 can be implemented by a Central Processing Unit (CPU), a Micro Processing Unit (MPU), a Digital Signal Processor (DSP) or a Field-Programmable Gate Array (FPGA) of the different-frequency measurement and evaluation apparatus for the cluster answering user.

FIG. 3 is a flowchart of different-frequency measurement and evaluation by a cluster answering user according to an embodiment of the present disclosure. As shown in FIG. 3, the flow includes the steps as follows.

Step S1: A cluster terminal successfully resides in a cell which supports cluster communications.

Step S2: A system information block of an LTE public network is read, and a signal evaluation threshold value of the LTE public network is acquired.

Step S3: A system information block SIB19 of a cluster network and a system information block SIB20 of the cluster network are read.

Firstly, it is determined whether a bTgInterFreqCarrierFreqListPresent flag bit in the cluster network system information block SIB19 is an effective value, and if the flag bit is the effective value, tTgInterFreqCarrierFreqList is read from the flag bit, then a switching threshold adjustment value of a corresponding different-frequency point is stored; and it is determined whether a bTInterFreqBlackCellListPresent flag bit in the cluster network system information block SIB20 is an effective value, and if the flag bit is the effective value, tTInterFreqBlackCarrierList in the flag bit is read, then a blacklist cell at a corresponding different-frequency point is stored.

Step S4: Different-frequency measurement is configured for a cluster answering user, wherein a blacklist cell in the tTInterFreqBlackCarrierList in the cluster network system information block SIB20 is also configured.

In a measurement configuration process, the blacklist cell read by the tTInterFreqBlackCarrierList in the newly added cluster network system information block SIB20 is configured for a physical layer.

Step S5: A different-frequency result of physical measurement is saved.

Step S6: Cells barred for N times in a cluster network and in a cell list barred by an LTE public network are filtered.

Step S7: Different-frequency measurement is performed on a measurement result and an evaluation result.

In an evaluation process of the measurement result, when evaluation is performed using a signal quality value: in a high-priority evaluation process, a signal quality threshold adjustment value contained in the newly added cluster network system information block SIB19 needs to be added to an original LTE public network signal quality evaluation threshold, and in a low-priority evaluation process, a signal quality threshold adjustment value carried in the newly added cluster network system information block SIB19 needs to be added on the basis of the original LTE public network signal quality evaluation threshold; and when evaluation is performed using a signal strength value: in a high-priority evaluation process, a signal strength threshold adjustment value carried in the newly added cluster network system information block SIB19 needs to be added on the basis of an original LTE public network signal strength evaluation threshold, while in a low-priority evaluation process, a signal strength threshold adjustment value contained in the newly added cluster network system information block SIB19 needs to be added to the original LTE public network signal strength evaluation threshold.

Step S8: A cell list meeting a switching threshold is sent to a target module, a switching cell list is compared with a locally saved cell list, the same cells therein are saved locally, the number of times of comparison is recorded, cells which have been compared for N times are added to a Bar list of the cluster network, and a corresponding Bar timer is started; and the switching cell list is saved locally, and a timer for answer switching is started to determine whether an answer timer expires.

Step S9: When the answer timer does not expire, corresponding cells in a locally maintained Bar cell list are deleted.

Step S10: After a cell is successfully switched to a certain cell in the switching cell list, a cluster Bar cell list and an LTE public network Bar cell list, which are maintained locally, are eliminated, and a different-frequency measurement process is restarted for the cluster answering user.

Step S11: If the switching answer timer expires in Step S8, it is shown that switching of the switching cell list is not completed within specified time, and different-frequency measurement process in a cluster answering state is recovered.

To sum up, the different-frequency measurement and evaluation for the cluster answering user in the embodiment of the present disclosure are performed by reusing an implementation mode of an LTE public network, and the different-frequency measurement for an answering user under the cluster network is realized by adjusting the evaluation threshold of the cells which support group communications and filtering the blacklist cell which is not supported by the cluster network.

An embodiment of the present disclosure also provides a computer readable storage medium, which includes a set of computer executable instructions, wherein the instructions are configured to execute the different-frequency measurement and evaluation method for the cluster answering user according to the embodiment of the present disclosure.

To sum up, the embodiments of the present disclosure have the beneficial effects that:

the embodiments of the present disclosure enable the cluster terminal to timely measure a better adjacent cell and to switch to the better adjacent cell, thereby making the cluster terminal always reside in a better cell to use the voice and data services, ensuring the quality of the services and bringing the user experience.

Although the present disclosure is described in detail, the present disclosure is not limited thereto, and those skilled in the art can make modifications according to the principle of the present disclosure. Thus, various modifications made according to the principle of the present disclosure should be interpreted as falling within the protection scope of the present disclosure.

What is claimed is:

1. A method for different-frequency measurement and evaluation, comprising:
    acquiring a public network signal evaluation threshold value and a signal threshold adjustment value, wherein the signal threshold adjustment value is for adjusting an evaluation threshold;
    performing different-frequency measurement on cells and saving a result of the different-frequency measurement; and
    evaluating the saved result of the different-frequency measurement using the acquired public network signal evaluation threshold value and the acquired signal threshold adjustment value;
    wherein performing the different-frequency measurement on cells and saving the result of the different-frequency measurement comprises:
    determining whether information of a blacklist cell which is not supported by a cluster network is detected by checking the cells;
    performing different-frequency measurement on cells except the blacklist cell using the acquired information of the blacklist cell and saving a result of the different-frequency measurement when the information of the blacklist cell which is not supported by the cluster network is detected; and
    performing different-frequency measurement on all the cells and saving a result of the different-frequency measurement when no information of a blacklist cell which is not supported by the cluster network is detected.

2. The method according to claim 1, wherein the public network signal evaluation threshold value and the signal threshold adjustment value are acquired from a cluster network system, respectively.

3. The method according to claim 2, wherein the public network signal evaluation threshold value comprises a public network signal quality evaluation threshold value and a public network signal strength evaluation threshold value, and the signal threshold adjustment value comprises a signal quality threshold adjustment value and a signal strength threshold adjustment value.

4. The method according to any one of claim 2, wherein the saved result of the different-frequency measurement is evaluated in at least one of following manners:
    signal quality value-based evaluation manner; and
    signal strength value-based evaluation manner.

5. The method according to claim 4, wherein
    the signal quality value-based evaluation comprises:
        accumulating the public network signal quality evaluation threshold value and the signal quality threshold adjustment value to obtain a threshold value meeting cell switching; and
    the signal strength value-based evaluation comprises:
        accumulating the public network signal strength evaluation threshold value and the signal strength threshold adjustment value to obtain a threshold value meeting cell switching.

6. The method according to claim 1, wherein the information of the blacklist cell is acquired from a cluster network system.

7. The method according to claim 6, wherein the public network signal evaluation threshold value comprises a public network signal quality evaluation threshold value and a public network signal strength evaluation threshold value, and the signal threshold adjustment value comprises a signal quality threshold adjustment value and a signal strength threshold adjustment value.

8. The method according to any one of claim 6, wherein the saved result of the different-frequency measurement is evaluated in at least one of following manners:
    signal quality value-based evaluation manner; and
    signal strength value-based evaluation manner.

9. The method according to claim 8, wherein
    the signal quality value-based evaluation comprises:
        accumulating the public network signal quality evaluation threshold value and the signal quality threshold adjustment value to obtain a threshold value meeting cell switching; and
    the signal strength value-based evaluation comprises:
        accumulating the public network signal strength evaluation threshold value and the signal strength threshold adjustment value to obtain a threshold value meeting cell switching.

10. The method according to claim 1, wherein the public network signal evaluation threshold value comprises a public network signal quality evaluation threshold value and a public network signal strength evaluation threshold value, and the signal threshold adjustment value comprises a signal quality threshold adjustment value and a signal strength threshold adjustment value.

11. The method according to claim 1, wherein the saved result of the different-frequency measurement is evaluated in at least one of following manners:
    signal quality value-based evaluation manner; and
    signal strength value-based evaluation manner.

12. The method according to claim 11, wherein
    the signal quality value-based evaluation comprises:
        accumulating the public network signal quality evaluation threshold value and the signal quality threshold adjustment value to obtain a threshold value meeting cell switching; and
    the signal strength value-based evaluation comprises:
        accumulating the public network signal strength evaluation threshold value and the signal strength threshold adjustment value to obtain a threshold value meeting cell switching.

13. An apparatus for different-frequency measurement and evaluation, comprising:
    a processor; and
    a memory storing programming instructions executable by the processor;
    wherein the processor is configured to execute the stored programming instructions to perform steps comprising:

acquiring a public network signal evaluation threshold value and a signal threshold adjustment value, wherein the signal threshold adjustment value is for adjusting an evaluation threshold;

performing different-frequency measurement on cells and saving a result of the different-frequency measurement; and evaluating the saved result of the different-frequency measurement using the acquired public network signal evaluation threshold value and the acquired signal threshold adjustment value;

wherein performing the different-frequency measurement on cells and saving the result of the different-frequency measurement comprises:

determining whether information of a blacklist cell which is not supported by a cluster network is detected by checking the cells;

performing different-frequency measurement on cells except a blacklist cell using the acquired information of the blacklist cell and save a result of the different-frequency measurement when the information of the blacklist cell which is not supported by the cluster network is detected, and performing different-frequency measurement on all the cells and saving a result of the different-frequency measurement when no information of a blacklist cell which is not supported by the cluster network is detected.

14. The apparatus according to claim 13, wherein the saved result of the different-frequency measurement is evaluated in at least one of following manners: signal quality value-based evaluation manner; and signal strength value-based evaluation manner;

the signal quality value-based evaluation comprises: accumulating a public network signal quality evaluation threshold value and a signal quality threshold adjustment value to obtain a threshold value meeting cell switching; and the signal strength value-based evaluation comprises: accumulating a public network signal strength evaluation threshold value and a signal strength threshold adjustment value to obtain a threshold value meeting cell switching.

15. A computer readable non-transitory storage medium, comprising a set of computer executable instructions which are configured to execute a method for different-frequency measurement and evaluation, wherein the method comprises:

acquiring a public network signal evaluation threshold value and a signal threshold adjustment value, wherein the signal threshold adjustment value is for adjusting an evaluation threshold;

performing different-frequency measurement on cells and saving a result of the different-frequency measurement; and evaluating the saved result of the different-frequency measurement using the acquired public network signal evaluation threshold value and the acquired signal threshold adjustment value;

wherein performing the different-frequency measurement on cells and saving the result of the different-frequency measurement comprises:

determining whether information of a blacklist cell which is not supported by a cluster network is detected by checking the cells;

performing different-frequency measurement on cells except a blacklist cell using the acquired information of the blacklist cell and save a result of the different-frequency measurement when the information of the blacklist cell which is not supported by the cluster network is detected, and performing different-frequency measurement on all the cells and saving a result of the different-frequency measurement when no information of a blacklist cell which is not supported by the cluster network is detected.

* * * * *